US006979170B2

(12) United States Patent
Dery et al.

(10) Patent No.: US 6,979,170 B2
(45) Date of Patent: Dec. 27, 2005

(54) VERTICAL AXIS WINDMILL AND SELF-ERECTING STRUCTURE THEREFOR

(75) Inventors: Jacquelin Dery, Outremont (CA); Laurent Mondou, St-Lambert (CA)

(73) Assignee: Dermond Inc., Outremont (CA)

( * ) Notice: Subject to any disclaimer, the term of this patent is extended or adjusted under 35 U.S.C. 154(b) by 106 days.

(21) Appl. No.: 10/472,578

(22) PCT Filed: Jan. 24, 2003

(86) PCT No.: PCT/CA03/00093

§ 371 (c)(1),
(2), (4) Date: Sep. 22, 2003

(87) PCT Pub. No.: WO03/062636

PCT Pub. Date: Jul. 31, 2003

(65) Prior Publication Data

US 2004/0120820 A1   Jun. 24, 2004

(30) Foreign Application Priority Data

Jan. 24, 2002  (CA) .................................... 2369229

(51) Int. Cl.[7] ............................................... F03D 3/06
(52) U.S. Cl. .................... 415/4.2; 415/907; 416/224; 416/229 R; 416/134 R
(58) Field of Search ................. 415/4.2, 4.4, 122.1, 415/907, 240, 135, 134 R; 416/132 A, 132 B, 416/170 R, 224, 229 R, 246

(56) References Cited

U.S. PATENT DOCUMENTS

| | | | |
|---|---|---|---|
| 2,177,801 A | 10/1939 | Erren | |
| 3,918,839 A | 11/1975 | Blackwell et al. | |
| 4,037,989 A | 7/1977 | Huther | |
| 4,112,311 A | 9/1978 | Theyse | |
| 4,285,636 A | 8/1981 | Kato et al. | |
| 4,291,233 A | 9/1981 | Kirschbaum | |
| 4,324,528 A | 4/1982 | Svenning | |
| 4,452,568 A * | 6/1984 | Andersson | 416/119 |
| 4,461,957 A | 7/1984 | Jallen | |
| 4,513,206 A | 4/1985 | Gervasio et al. | |
| 4,525,124 A * | 6/1985 | Watson et al. | 416/132 B |
| 4,565,929 A | 1/1986 | Baskin et al. | |

(Continued)

FOREIGN PATENT DOCUMENTS

DE         91 00 693         5/1991

(Continued)

OTHER PUBLICATIONS

Patent Abstracts of Japan, vol. 2000, No. 16, May 8, 2003 & JP 2001 020849 A (Hitachi Zosen Corp.

*Primary Examiner*—Edward K. Look
*Assistant Examiner*—Devin Hanan
(74) *Attorney, Agent, or Firm*—Quarles & Brady LLP

(57) ABSTRACT

The present invention provides a structure comprising a blade attachment, a blade structure, an integrated driving shaft/generator for a wind system such as a vertical axis windmill, and a self erecting structure for such a wind system, together with an erecting method thereof.

35 Claims, 15 Drawing Sheets

U.S. PATENT DOCUMENTS

| | | |
|---|---|---|
| 4,613,763 A | 9/1986 | Swansen |
| 4,764,090 A | 8/1988 | Danson |
| 5,133,637 A | 7/1992 | Wadsworth |
| 5,151,610 A | 9/1992 | St. Germain |
| 5,171,127 A * | 12/1992 | Feldman et al. ............ 416/119 |
| 5,256,034 A | 10/1993 | Sultzbaugh |
| 5,299,913 A * | 4/1994 | Heidelberg ............. 416/197 A |
| 5,499,904 A | 3/1996 | Wallace et al. |
| 5,616,963 A | 4/1997 | Kikuchi |
| 5,663,600 A | 9/1997 | Baek et al. |
| 5,982,046 A | 11/1999 | Minh |
| 6,015,258 A | 1/2000 | Taylor |

FOREIGN PATENT DOCUMENTS

| | | |
|---|---|---|
| DE | 40 07 017 A1 | 5/1992 |
| DE | 197 41 495 A1 | 3/1999 |
| DE | 198 59 865 A1 | 8/2000 |
| WO | WO 96/30647 | 10/1996 |

* cited by examiner

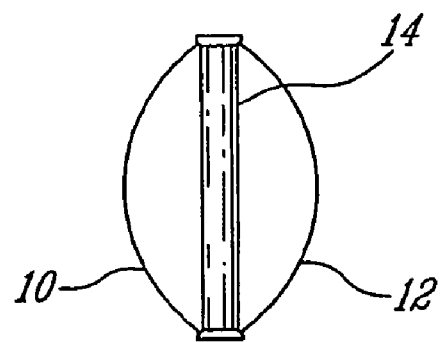
FIG_1 (PRIOR ART)
FIG_2 (PRIOR ART)
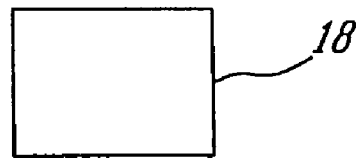
FIG_3 (PRIOR ART)

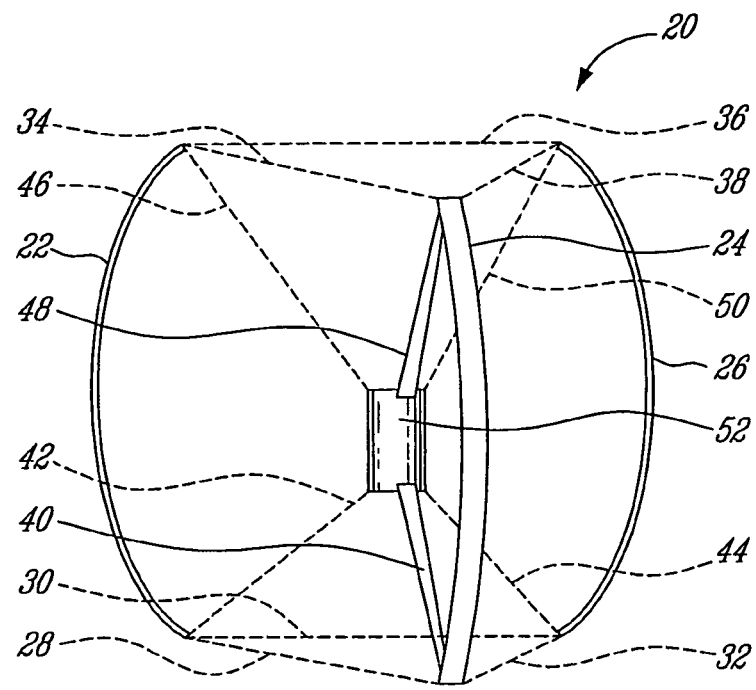
FIG_4
FIG_5
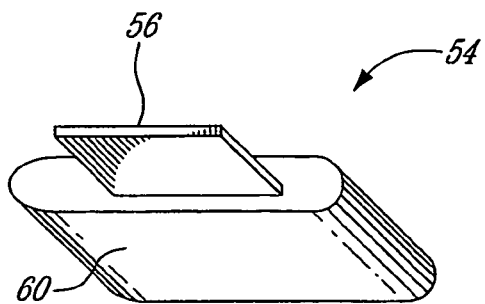
FIG_6

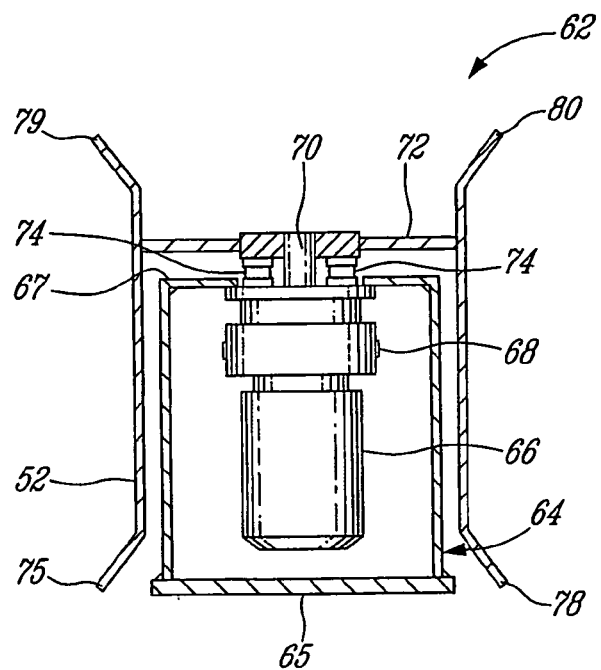
FIG_7
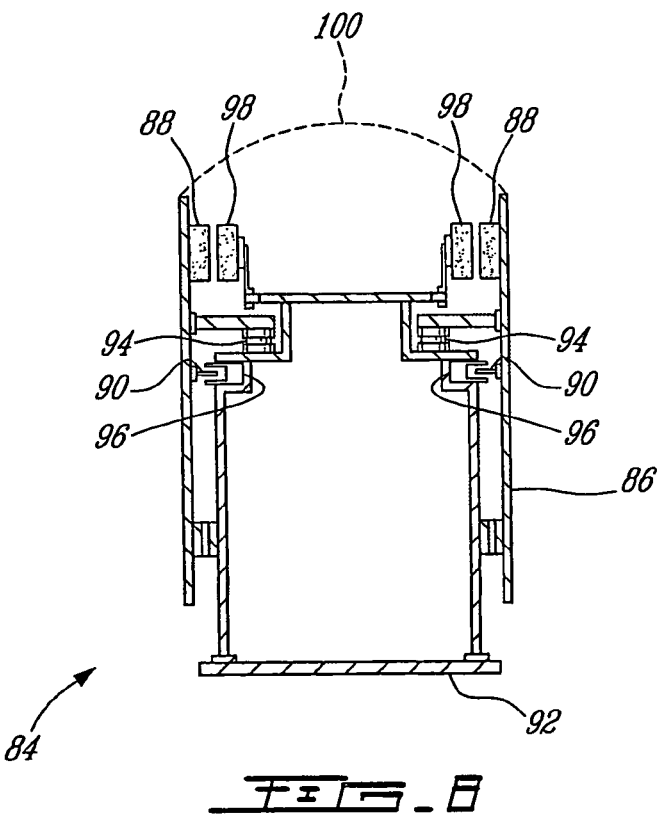
FIG_8

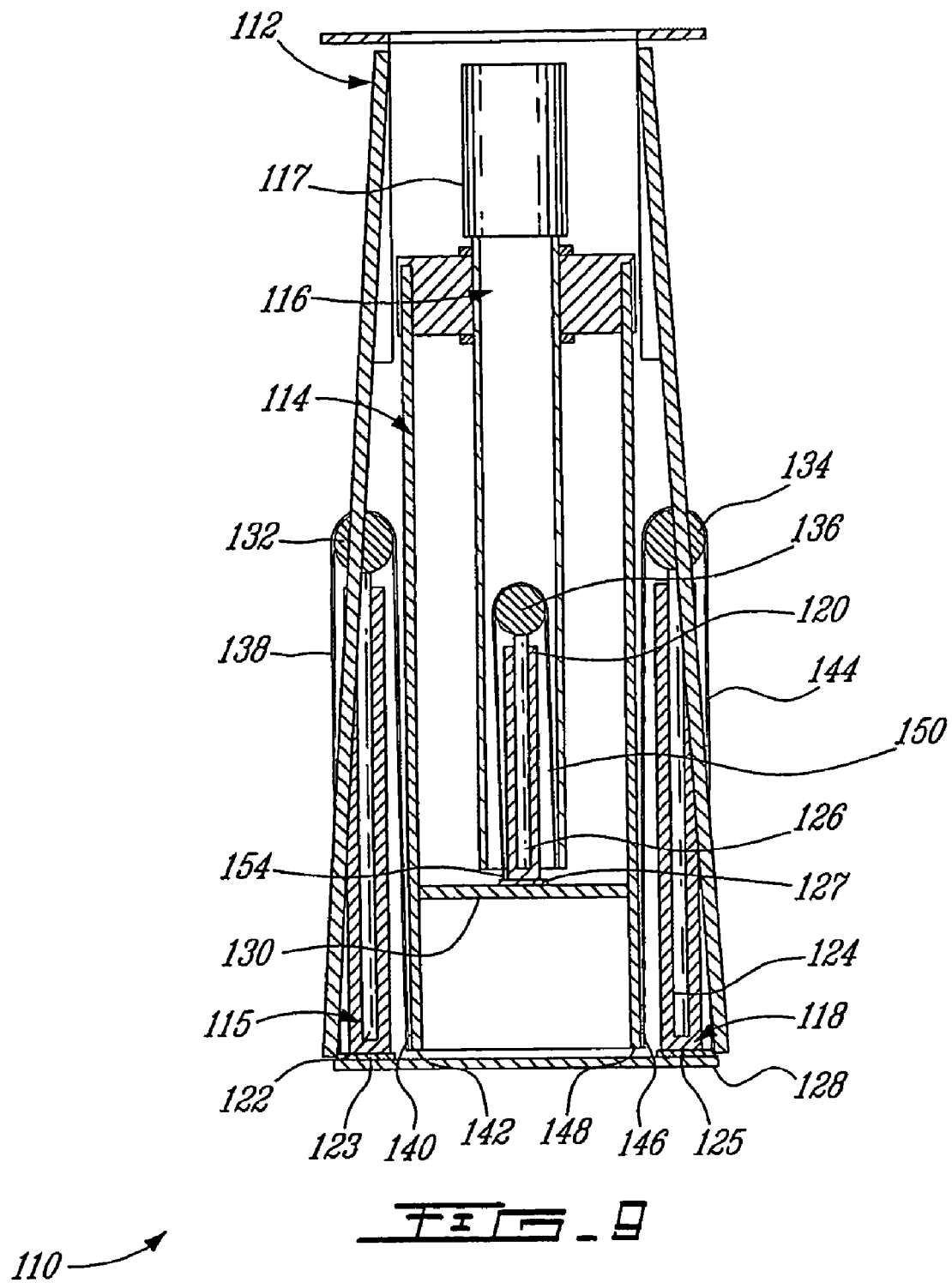

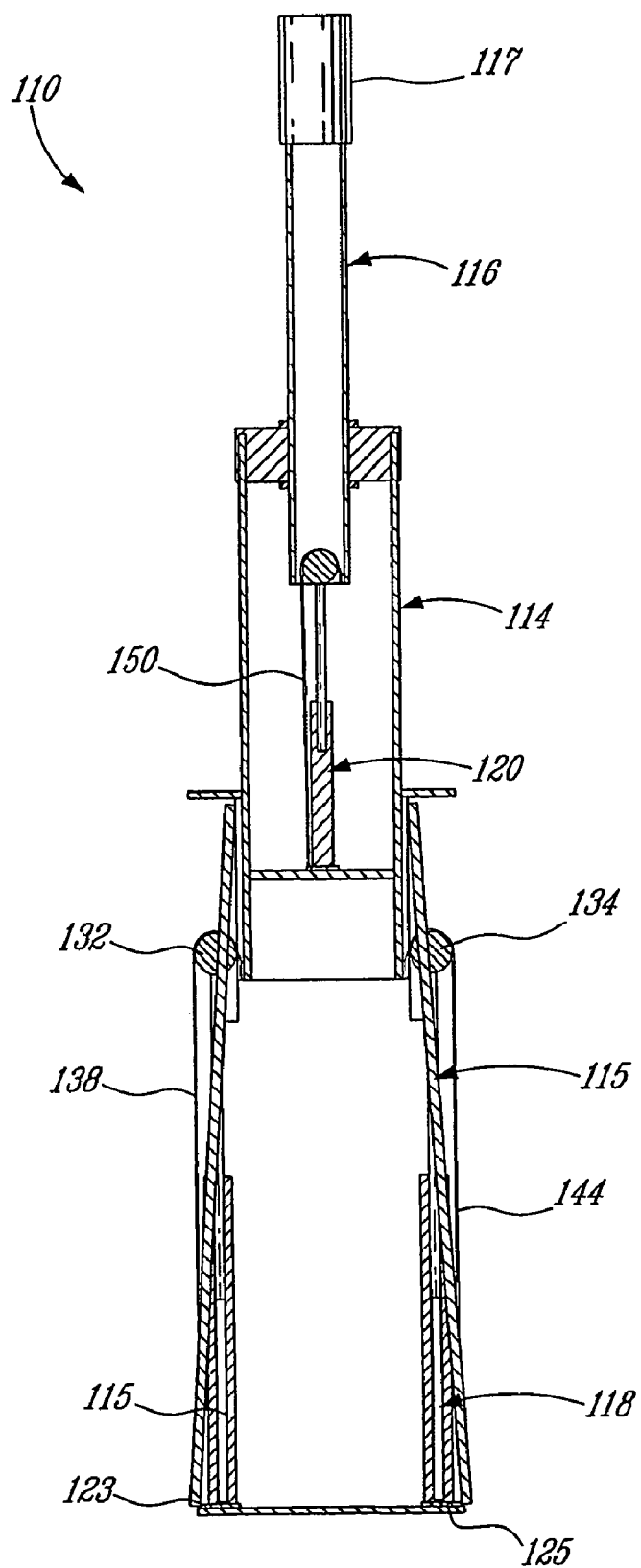
FIG_10

FIG_13

FIG_14

FIG_15

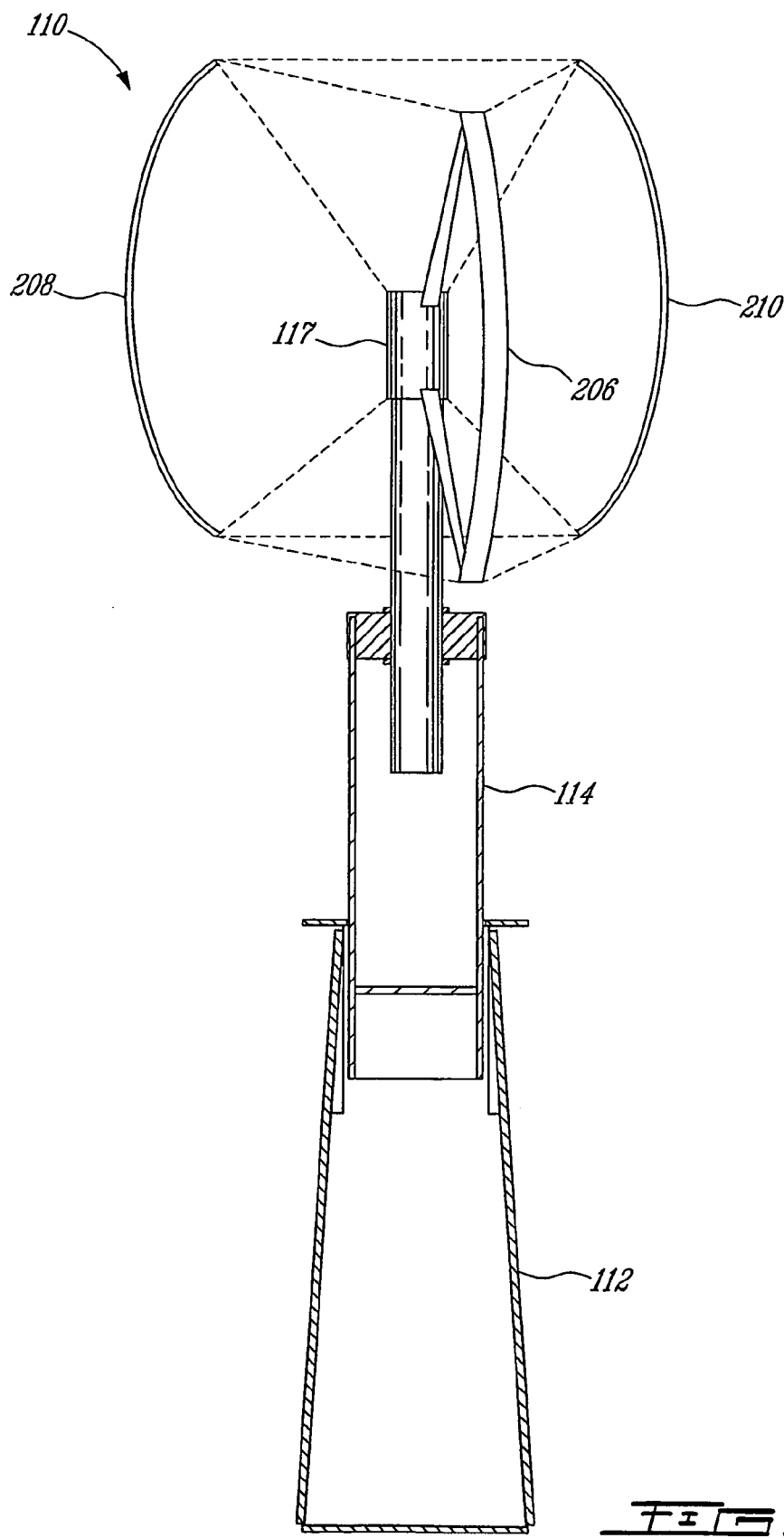
FIG_20

VERTICAL AXIS WINDMILL AND SELF-ERECTING STRUCTURE THEREFOR

FIELD OF THE INVENTION

The present invention relates to windmills. More specifically, the present invention is concerned with a vertical axis windmill and to a self-erecting structure therefor.

BACKGROUND OF THE INVENTION

Historically, hydro and wind powers were among the first energy sources to be exploited by mankind. After a period of time when other forms of energy sources have cast a shadow on those, there is nowadays a renewed interest in energy conversion systems operable by renewable energy resources such as wind for instance.

Compared to hydropower generation, power generated by means of a windmill generally requires less civil works, depending on the method used to mount and anchor the windmill, and the impact on the environment is minimal.

Generally speaking, wind energy is used through two basic types of windmills. On the one hand, the vertical axis windmills are omni-directional, i.e. they are capable of reacting to the winds from any direction, and the power is typically available at the ground level. On the other hand, horizontal axis windmills make use of a rotating disk that must be rightly aligned at all times in relation to the wind direction.

Even though the basic configuration of vertical axis windmills is therefore simpler than that of its horizontal counterpart due to the above mentioned characteristics, there are features of vertical axis windmills that need to be optimized in order to obtain an efficiency as high as its potentiality is.

For one thing, the power potential is proportional to the air density multiplied by the swept area, i.e. the projected blade area, multiplied by the cube of the air velocity. In the case where the fluid is air, the density is weak, and thus the swept area is of importance. As far as the forces on the devices and on the supporting structure are concerned, the windmill has therefore to withstand important wind speeds.

In summary, the amount of wind energy captured by a windmill depends on the section of the air flux sweeping the blades. This section is defined as the projection of the area effectively swept onto a plane perpendicular to the airflow. The geometry of the swept section is a matter of design choice. In the prior art are found variable geometry designs and fixed geometry designs, depending on the technology employed (see FIGS. 1 to 3).

Considering the above, a problem to be solved lies in the requirement that the blades should provide a maximized swept area for a maximal wind catching ability, while simultaneously they must be able to withstand high bending moments and forces. It has to be considered that on the one hand wind rotors having blades of the most efficient wind catching structure cause the most stress forces on the frame for the wind rotor and in extreme situations may cause damage thereto, and that, on the other hand, blade configurations which cause the least stress to the windmill structure in turn are the least efficient in wind energy gathering ability and transfer.

Efforts have been made in the art so as to design efficient blades. For example, FIG. 1 shows a type of blades 10 and 12 directly connected to the ends of a vertical axis 14. In the case of a blade connected through wing-beams to a central shaft beams, FIG. 2 shows an example of a blade 16 having a curved profile, and FIG. 3 shows a blade 18 having a square profile.

Also, the costs of the required civil work and of erection have to be considered.

In spite of intense work in the field and numerous proposed arrangements to generate electricity from the wind, there is still room for improvement in the design of the overall structure of a windmill, of the blades, of the power unit configuration and in the method for erection thereof, so as to design a vertical axis windmill of high performance with a reduced potential for damaging of the overall structure, which can be efficiently and economically manufactured and erected.

OBJECTS OF THE INVENTION

An object of the present invention is therefore to provide an improved vertical axis windmill.

SUMMARY OF THE INVENTION

More specifically, in accordance with an aspect of the present invention, there is provided a wind system of the type having a rotating shaft perpendicular to the ground, comprising:
 a plurality of blades positioned in a pre-strained rigid configuration as the wind system is at rest;
 a top set of horizontal tensioned wing-beams in a triangular configuration and connecting the blades to a top end of the rotating shaft; and
 a bottom set of horizontal tensioned wing-beams in a triangular configuration and connecting the blades to a bottom end of the rotating shaft; wherein the blades and sets of horizontal tensioned wing-beams form a flexible blade attachment assembly, which tends to get flattened under a centrifugal force and adopts a troposkein shape at a target speed of rotation, the troposkein shape being then maintained by the sets of horizontal tensioned wing-beams.

In accordance with another aspect of the present invention, there is provided a blade attachment structure for a windmill, comprising blades connected to a rotating shaft by wing-beams arranged in sets of horizontal wing-beams under tension having a triangular configuration and holding a spatial distribution of the blades, and by sets of securing elements having a triangular configuration and mounted respectively to each sets of horizontal wing-beams, wherein the blades are positioned in a pre-strained rigid configuration as the windmill is at rest.

In accordance with still a further aspect of the present invention, there is provided a blade attachment structure for a windmill comprising blades mounted to a driving shaft by means of tensioning means and positioned in a pre-strained rigid configuration as the windmill is at rest, the blades being connected in a spatial distribution to horizontal wing-beams under tension having a triangular configuration by securing elements having a triangular configuration, in such a way as to form a flexible assembly, which tends to get flattened under a centrifugal force and adopts a troposkein shape at a target speed of rotation, the troposkein shape being maintained by the tensioning means.

In accordance with still a further aspect of the present invention, there is provided a generator assembly for a windmill to produce electricity, comprising a generator connected to a rotation-increasing device, said rotation-increasing device having a driven shaft mounted to a rotating shaft of the windmill.

In accordance with still another aspect of the present invention, there is provided a generator assembly for a windmill to produce electricity, comprising a rotating casing supported by a stationary base through steady bearings, brake shoes, and a stator, wherein said rotating casing is connected to a rotating shaft of the windmill.

In accordance with still another aspect of the present invention, there is provided a self erecting structure for a windmill, comprising a lower portion, a middle portion able to telescope in the lower portion, and a top portion in the form of a stationary enclosure holding a rotating shaft of the windmill and able to telescope in the middle portion, and a method for erecting a self-contained windmill made of a plurality of telescoping portions from a lying position comprising successively lifting the telescoping portions to a fully extended position thereof.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 1, which is labeled "Prior Art", is a schematic representation of an attachment of a windmill blade;

FIG. 2, which is labeled "Prior Art", is an outline of a curved blade;

FIG. 3, which is labeled "Prior Art", is an outline of a right angle profiled blade;

FIG. 4 is a schematic representation of a blade attachment structure according to an embodiment of the present invention;

FIG. 5 is an outline of a blade that is used in the assembly of FIG. 4;

FIG. 6 is a perspective, partly sectional, view of a blade according to another aspect of the present invention;

FIG. 7 is a schematic representation of an integral generator driven shaft for a windmill according to another aspect of the present invention;

FIG. 8 is a schematic representation of an integral driven shaft/generator assembly according to a further embodiment of the present invention;

FIG. 9 is a front view of the system according to an embodiment of the present invention in a contracted configuration;

FIG. 10 is a front view of the system according to an embodiment of the present invention in a deployed configuration;

FIG. 20 shows the system as it stands at the end of the final step 290 of the method of FIG. 11.

DESCRIPTION OF THE PREFERRED EMBODIMENT

Figure 11:
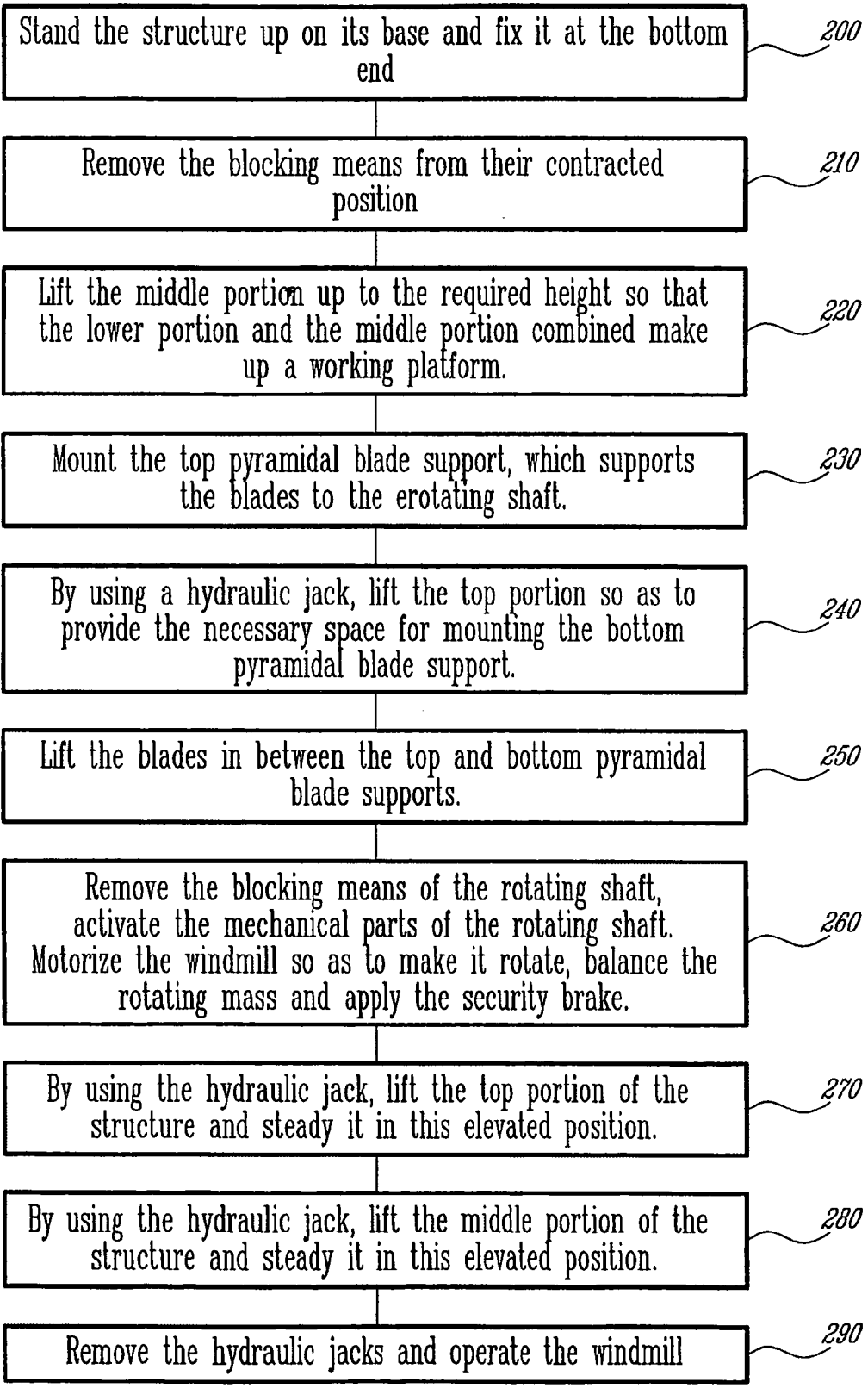
FIG. 11 is a block diagram of the steps of a method for self-erection of a windmill according to an aspect of the present invention.

Generally stated, the present invention provides a structure comprising a blade attachment, a blade structure, an integrated driving shaft/generator for a wind system such as a vertical axis windmill, and a self erecting structure for such a wind system, together with an erecting method thereof.

Referring first to FIGS. 4 and 5 of the appended drawings, a blade attachment structure 20 according to an aspect of the present invention will be described, of the type mentioned hereinabove of a blade connected to a central shaft by means of wing-beams, and based on a fixed geometry enabling an improved wind catching section.

The blade attachment structure 20 includes three blades 22, 24, 26, two sets of horizontal wing-beams 28, 30, 32 and 34, 36 38 under tension and two sets of securing elements 40, 42, 44 and 46, 48, 50.

The sets of horizontal wing-beams each have a triangular configuration, one set (wing-beams 34, 36, 38) being located on top of the blade attachment structure 20, the other set (wing-beams 28, 30, 32) at the bottom thereof. Such sets of horizontal wing-beams hold the spatial distribution of the three blades 22, 24, 26.

The sets of securing elements also have a triangular configuration, one (46, 48, 50) being located on top of the blade attachment structure 20, while the other (40, 42, 44) is located at the bottom thereof, to secure the blades 22, 24, 26 to a rotating shaft 52.

It is to be noted that the rotating shaft 52 of the blade attachment structure 20 is short, providing compactness and robustness.

Furthermore, the use of tensioned wing-beams 28, 30, 32 and 34, 36, 38 enables to reduce the surface necessary for an improved wind catching capacity.

In such a blade attachment structure 20, the blades 22, 24, 26 are positioned in a pre-strained rigid configuration as the windmill is at rest, so that when rotation occurs, the strains cancel themselves due to the centrifugal force. This force creates a radial tension on the turning blades 22, 24, 26, which tends to spread them apart from one another, resulting in an overall flattening of the blade attachment structure 20 displayed in FIG. 4. Nonetheless, the blade attachment structure 20 keeps at all times a troposkein geometry (illustrated in FIG. 5), which is well-known now to constitute a configuration of equilibrium between gravity and centrifugal forces by providing condition of minimal stress on rotating blades. Indeed, it is generally believed that the troposkein geometry (from the Greek meaning "turning rope") is most effective when used in vertical windmill.

As will be apparent to people in the art, such a blade attachment structure 20 minimizes the dynamic stress on the turning blades 22, 24, 26. While allowing cost savings in the fabrication process, this also contributes to an extended lifetime of the blades.

In other words, the blade attachment structure according to the present invention consists in a flexible assembly, which tends to get flattened under the action of centrifugal force. It is designed to adopt a troposkein shape at a target speed of rotation. This troposkein shape is then maintained by means of tensioning means, which are used to couple the blades 22, 24, and 26 to the driving shaft 52.

Turning now to FIG. 6 of the appended drawings, another aspect of the present invention concerning the structure of the blades themselves will be described. As shown in FIG. 6, the blade 54 comprises a leaf spring 56 inserted into an aerodynamically profiled sheathing 60. The profile is designed to minimize the strain supported at a target speed of rotation of the windmill.

More specifically, the blade 54 may be constructed by directly molding the aerodynamically profiled sheathing 60 onto the leaf spring 56, or may be made of a material that can be easily added over the leaf spring 56.

The elements of the blade 54 are made of natural or composite materials, or any suitable materials selected so as to permit the machining of such an assembly and to minimize the weight thereof.

Rubber can be used for the aerodynamically profiled sheathing 60, either molded around or attached around the leaf spring 56. Obviously, molded composite material such as fiberglass or other easily moldable material can be used.

As will be apparent to one skilled in the art, the leaf spring 56 may be pre-shaped to the troposkein geometry or to a similar geometry to minimize the stress of the assembled blade assembly 20 of FIG. 4.

People in the art will understand that the blade structure of the present invention provides that the stresses are absorbed by the leaf spring 56. The aerodynamically profiled sheathing 60 is designed mostly in relation to the wind-capturing capacity of the structure since it does not have to withstand stresses. Therefore it can be light in weight and is easy and cost-effective to fabricate.

Another aspect of the present invention will now be described, in relation with the interconnection between the rotating shaft of the blade assembly to the shaft of the generator used to produce electricity.

More specifically, as illustrated in FIG. 7 of the appended drawings, a generator assembly 62 includes an enclosure 64 mounted on a base 65 and provided with a top 67, in which is mounted a generator 66 connected to a cycloid speed-increasing gear 68, and the driving shaft 52, which is mounted to a driven shaft 70 of the gear 68 via a circular plate 72.

Trust bearings 74 are provided between the plate 72 and the top 67 of the enclosure 64.

As can be seen from this figure, securing elements 74, 75, 78, 80 are connected to the driving shaft 52.

It is to be noted that steady bearings (not shown) and a brake (not shown), which interconnect the shaft 52 to the stationary enclosure 64 are also provided.

In another possible embodiment shown in FIG. 8, the windmill is provided with an integral driven shaft/generator assembly 84 devoid of a rotating increasing device.

The integral generator assembly 84 comprises a rotating casing 86 that receives the tensioning means in the same way as the driven shaft 52 of FIG. 7.

The rotating casing 86 shelters a rotor 88 and brake disks 90. A stationary base 92 supports the rotating casing 86 through steady bearing 94, brake shoes 96, and a stator 98. A cover 100, supported by the rotating enclosure 86, is provided on top of the integral generator 84.

As will be understood by people in the art, removing the speed increasing device of the embodiment shown in FIG. 7, and replacing it together with the generator of FIG. 7 by an integral driven shaft/generator in accordance to the embodiment shown in FIG. 8 provide for a reduction of the friction between mechanical parts. Therefore, the energy losses that occur in relation the speed-increasing device being avoided, the wind generator has an increased energy yield.

Moreover, the embodiment of FIG. 8 provides for a reduced complexity, resulting in a more stable wind turbine structure, and, additionally, to a reduced overall cost thereof.

Further, an integral driven shaft/generator in accordance to the embodiment shown in FIG. 8 opens the way to bigger wind generator.

Finally, turning now to FIGS. 9 to 20 of the appended drawings, a self-erecting structure for a windmill and a system of erection thereof according to another aspect of the present invention will be described.

Basically stated, the windmill is a self-contained, self-erecting structure 110. Seen in its folded state in FIG. 9 and in an erected state in FIG. 10, the structure 110 includes a lower portion 112, a middle portion 114, which can telescope in the lower portion 112, and a top portion in the form of a stationary enclosure 116, holding a rotating shaft 117, which can telescope in the middle portion 114.

The self-erecting structure 110 makes use of three removable hydraulic jacks 115, 118 and 120, each provided with a piston rod 122, 124 and 126 mounted on a respective base 123, 125 and 127. The bases 123 and 125 of the hydraulic jacks 115 and 118 respectively are mounted to the base 128 of the lower portion 112, while the base 127 of the hydraulic jack 120 is mounted to the base 130 of the middle portion 114.

The distal end of each piston rod 122, 124 and 126 is provided with a pulley, respectively 132, 134 and 136.

Generally stated, each hydraulic jacks 115, 118 and 120 has an erecting cable having a mobile end connected to the base of a structure to be erected, and a stationary end attached to the base of the jack.

More specifically, the hydraulic jack 115 is provided with an erecting cable 138, which has a mobile end 140 attached to a foot 142 of the middle portion 114, which passes through the pulley 132, and which has a stationary end (not visible in FIG. 9) attached to the base 123.

Similarly, the hydraulic jack 118 is provided with an erecting cable 144, which has a mobile end 146 attached to a foot 148 of the middle portion 114, which passes through the pulley 134, and which has a stationary end (not visible in FIG. 9) attached to the base 125.

Finally, the hydraulic jack 120 is provided with an erecting cable 150, which has a mobile end connected to a foot of the top portion 116, which passes through the pulley 136, and which has a stationary end 154 attached to the base 127.

As will be apparent to one skilled in the art, according to this configuration, the displacement traveled by a body to be lifted is twice that of the piston of a hydraulic jack.

It is to be noted that a guiding rail mechanism (not shown) ensures the lateral stiffness of the system of erection, while blocking mechanisms (not shown) provides stiffness before as well as after the extension of the windmill.

In the case, for example, when the top portion 116 has a length of 8 m, the center of the rotating shaft 117 is located at a height of 26 m from the ground surface. When the top portion 116 has a length of 11 m, the center of the rotating shaft 117 is as high as 30 meter from the ground surface (see FIG. 10).

The steps for deploying the self-erecting structure according to an embodiment of the present invention will now be described in relation to the block diagram of FIG. 11 and the FIGS. 12 to 20 of the appended drawings.

Figure 12:
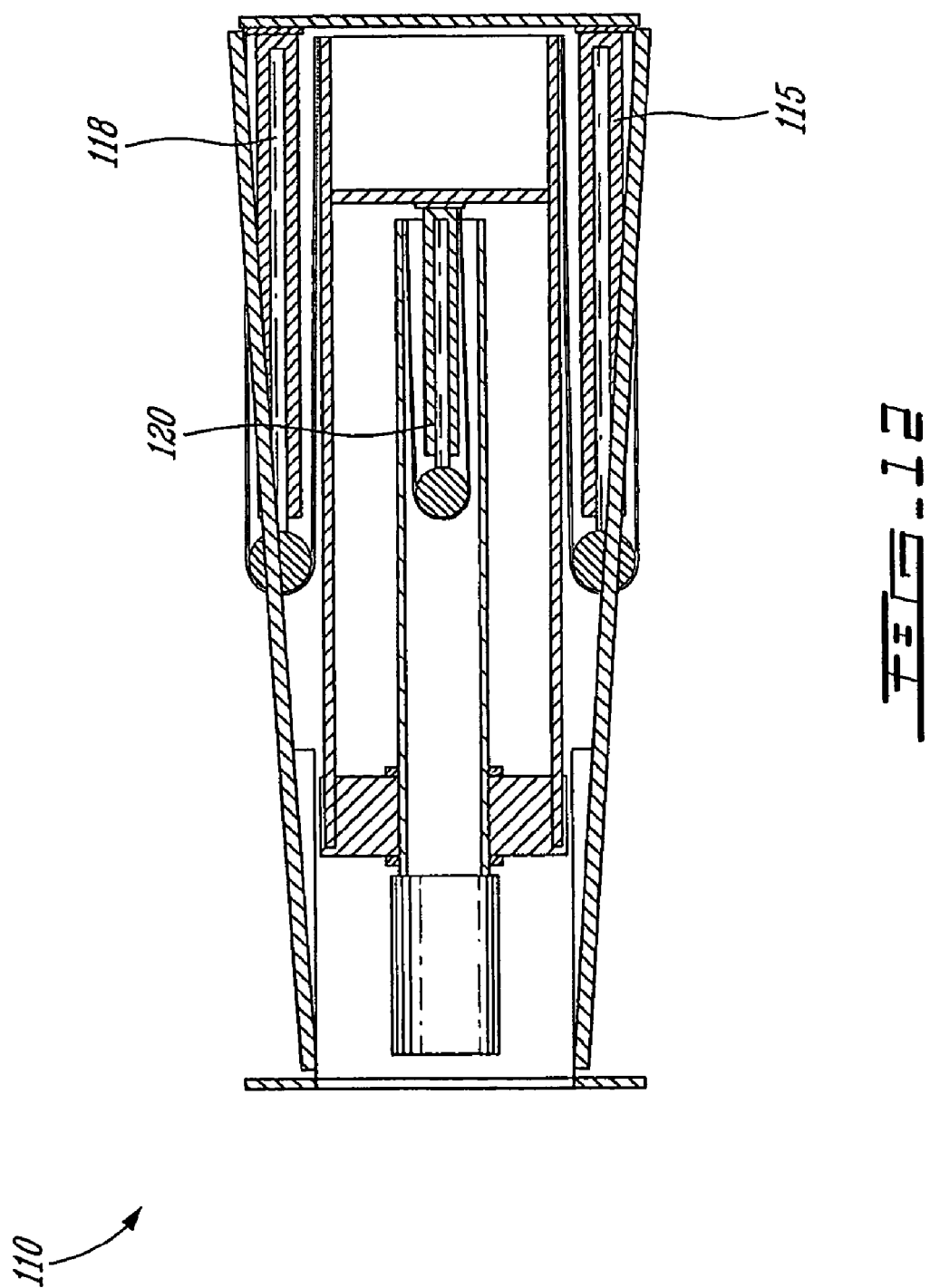
FIG. 12 shows the system as it stands ready for transportation, at the onset of the method of FIG. 11.

As shown in FIG. 12, the structure 110 is delivered lying in a retracted configuration with the hydraulic jacks 115, 118 and 120 properly connected.

Figure 13:
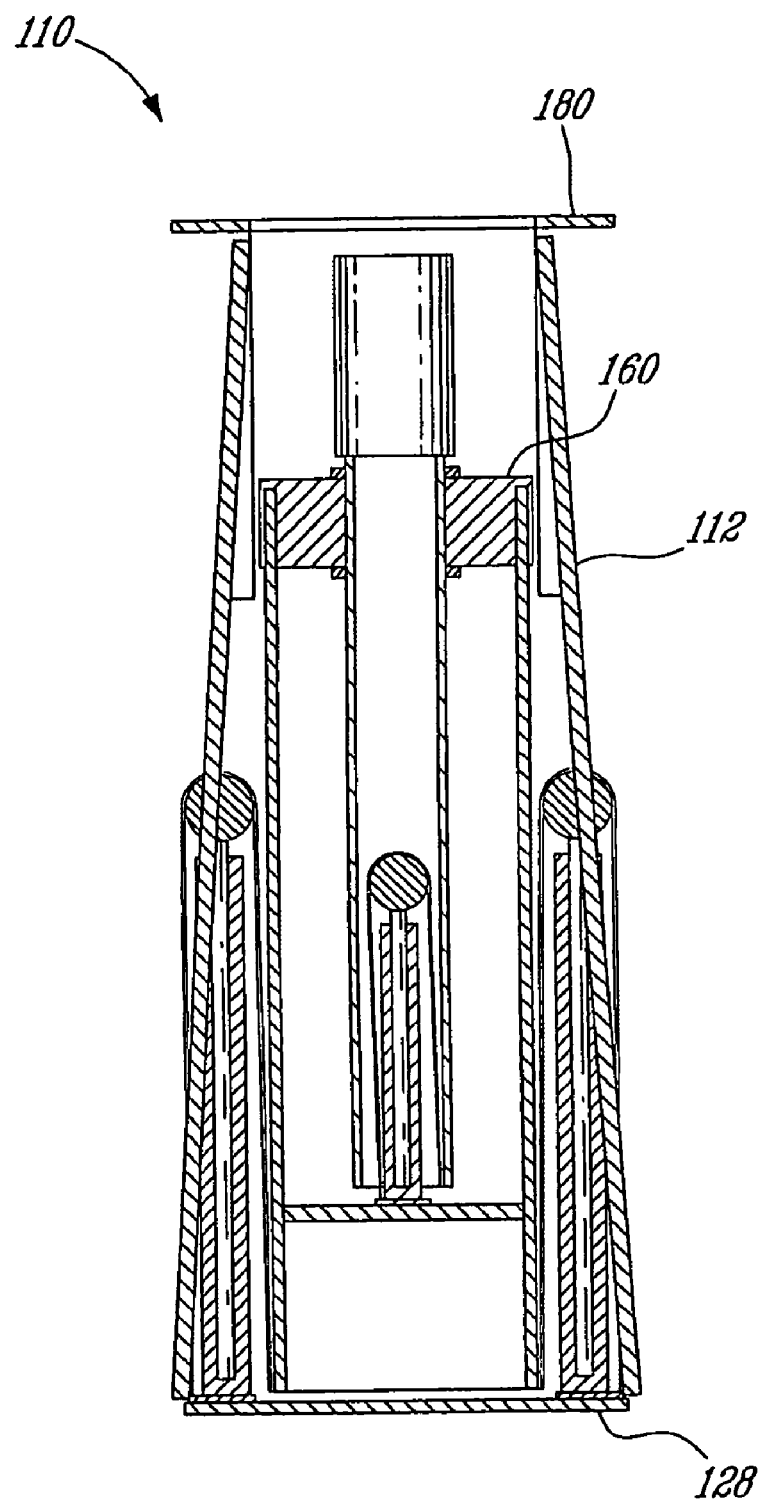
FIG. 13 shows the system as it stands at the end of step 200 of the method of FIG. 11.
Figure 14:
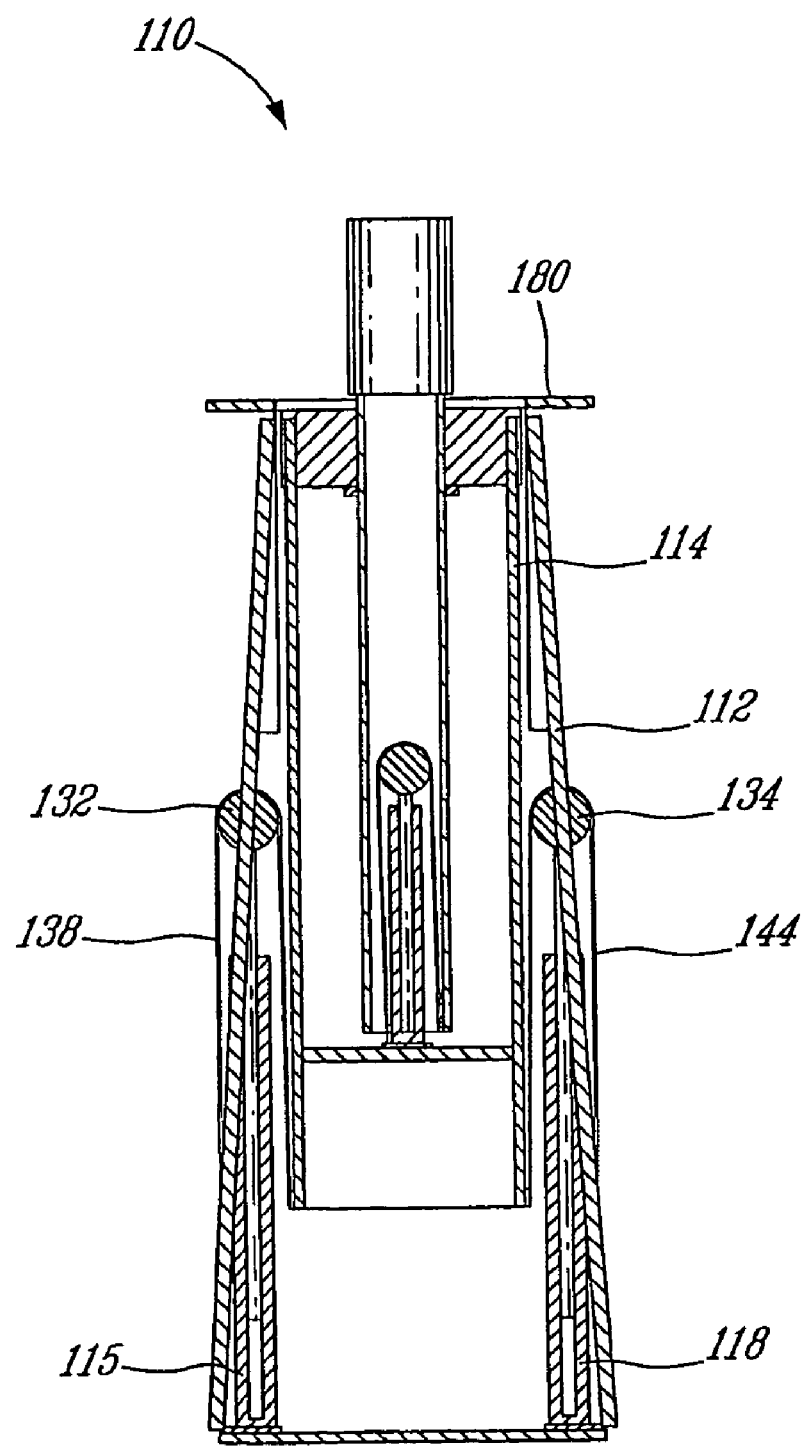
FIG. 14 shows the system as it stands at the end of step 220 of the method of FIG. 11.

In a first step 200, the structure 110 is taken from the lying position of FIG. 12, erected on its base and has the bottom 128 of the lower portion 112 fixedly mounted to the ground, so as to stand as shown in FIG. 13.

Then, the blocking mechanisms are relaxed from their contracted position (step 210) to permit lifting the middle portion 114 (step 220) so that the top surface 160 of the middle portion 114 (see FIG. 14) is level with the top surface 180 of the lower portion 112. At that stage of deployment, the structure provides a platform-like top surface 180 (see FIG. 14). To achieve this, the pistons rods 122 and 124 of the hydraulic jacks 115 and 118 respectively are extended simultaneously so that the cables 138 and 144, respectively engaged in the pulleys 132 and 134, pull the middle portion 114 up.

Figure 15:
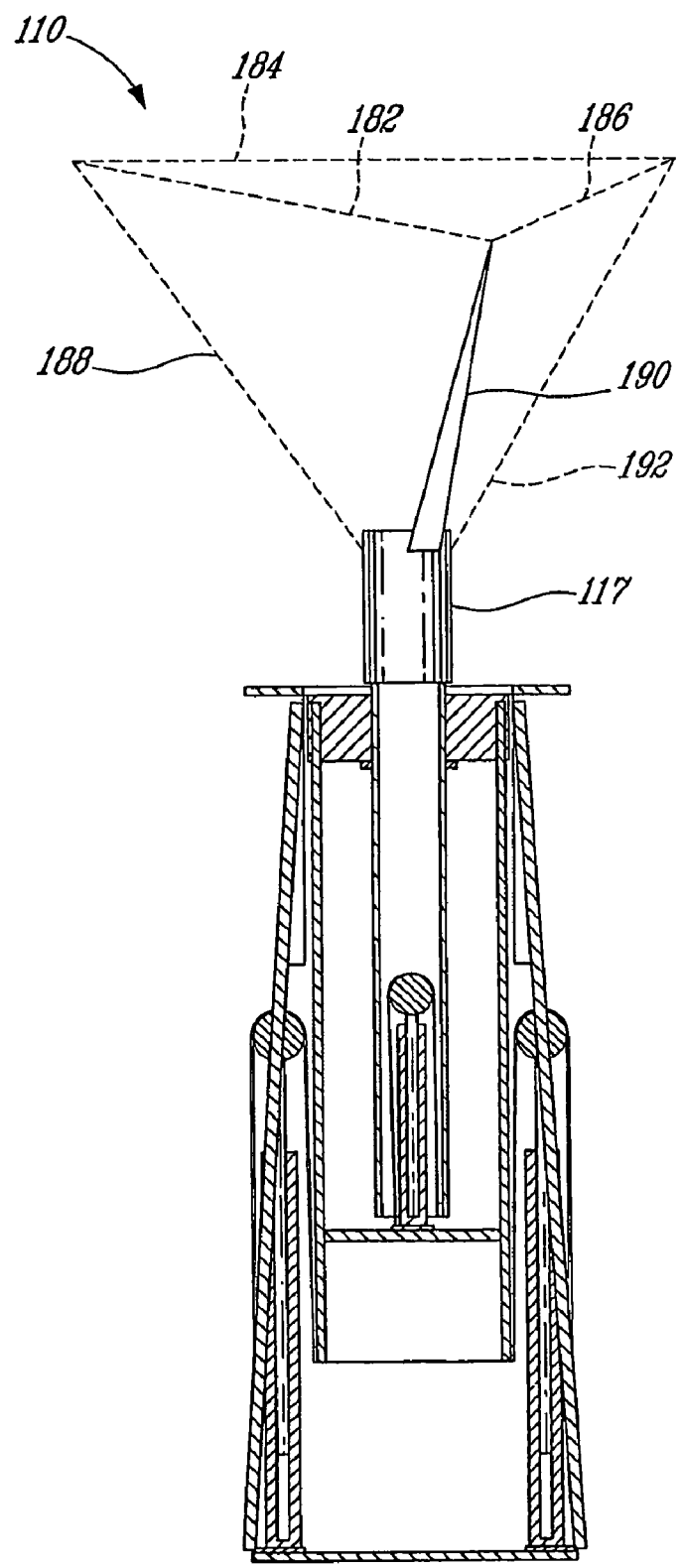
FIG. 15 shows the system as it stands at the end of step 230 of the method of FIG. 11.

In step 230, horizontal wing-beams 182, 184, 186 as described in the above section, and corresponding securing elements 188, 190, and 192 forming a top pyramidal blade support are mounted to the rotating shaft 117 (see FIG. 15).

Figure 16:
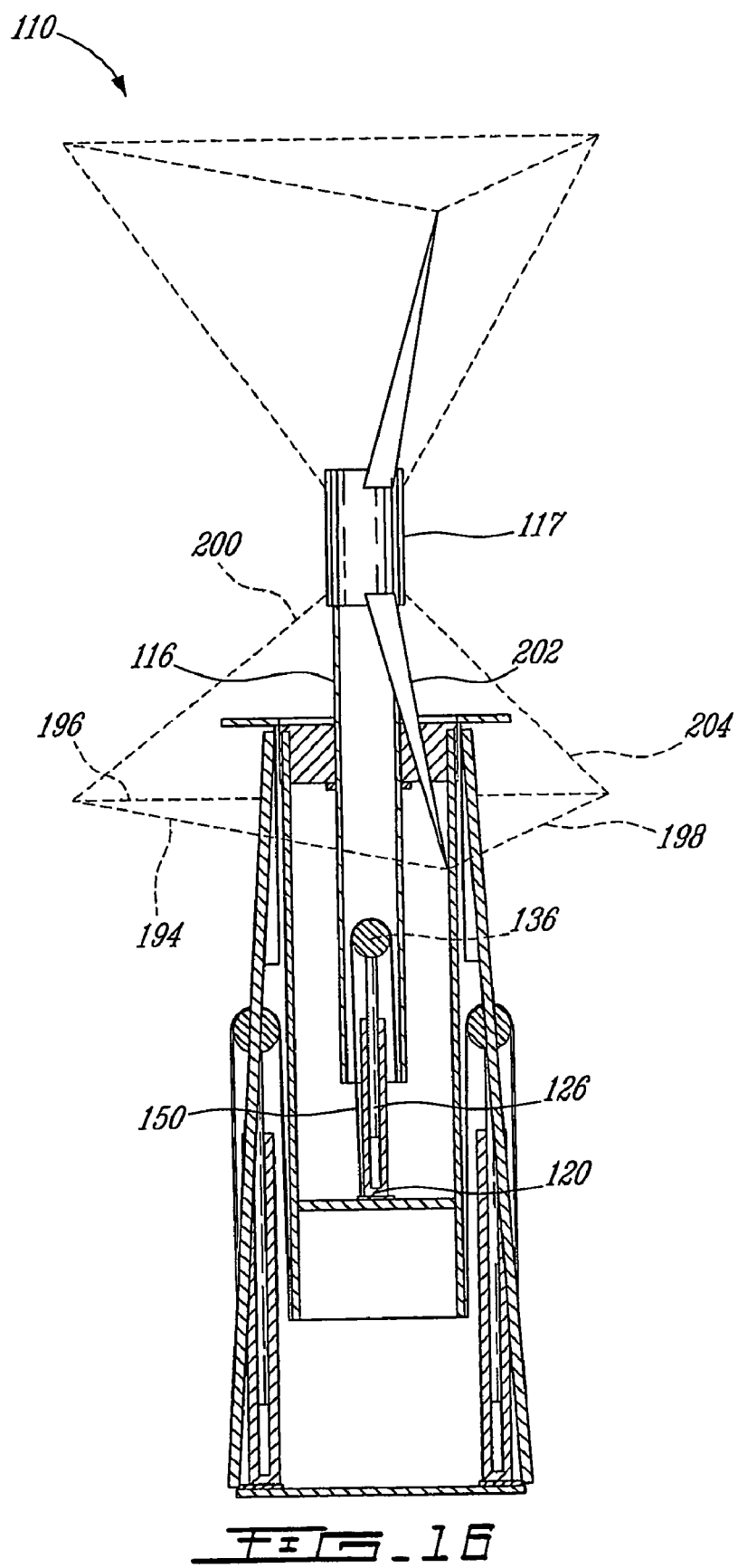
FIG. 16 shows the system as it stands at the end of step 240 of the method of FIG. 11.

Thereafter, in step 240, the piston rod 126 of the hydraulic jack 120 is extended so that the cable 150 engaged in the pulley 136, pulls the top portion 116 up to provide sufficient space to mount horizontal wing-beams 194, 196 and 198 and corresponding securing elements 200, 202 and 204, forming a bottom pyramidal blade support, to the rotating shaft 117 (see FIG. 16).

Figure 17:
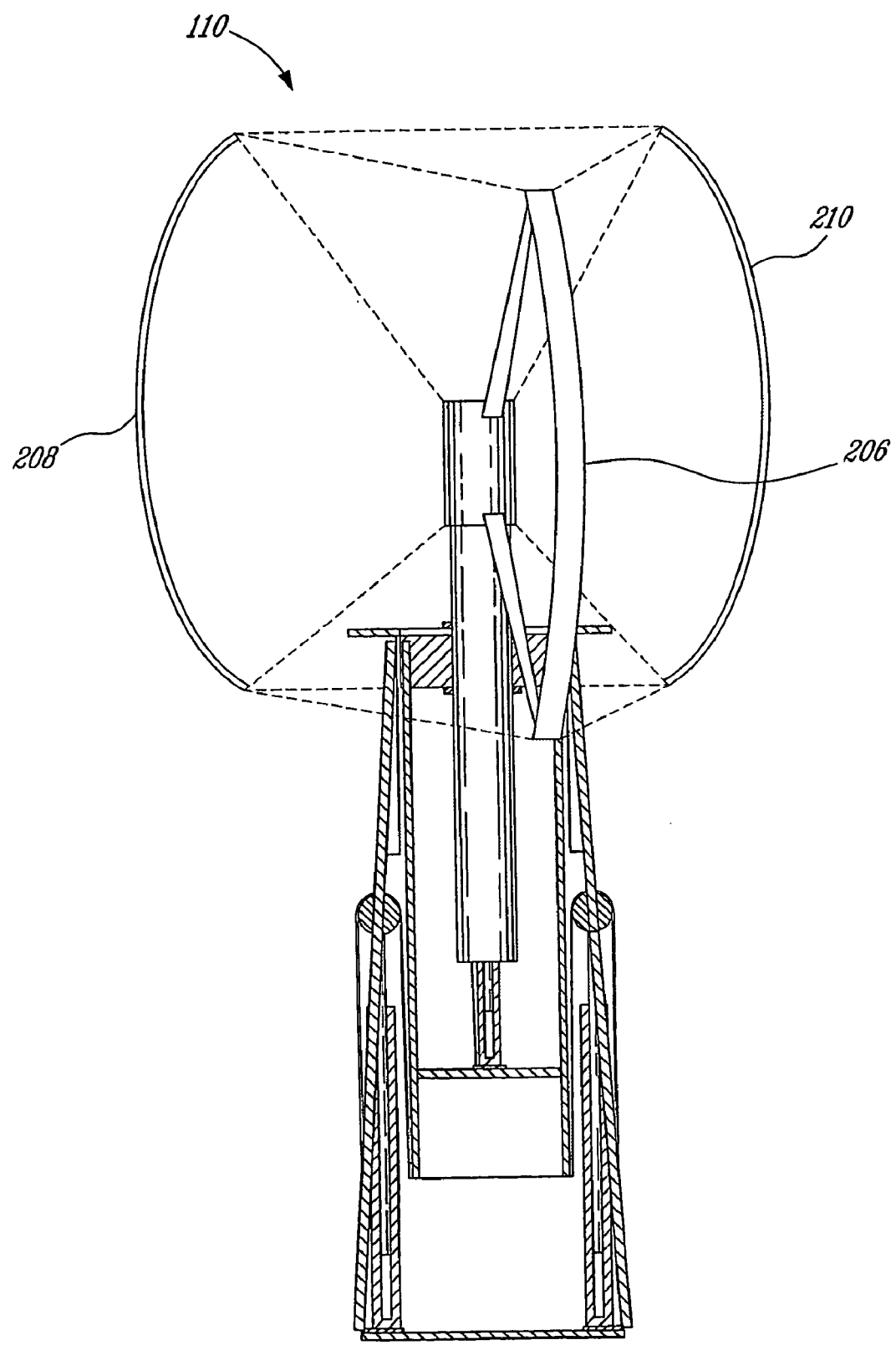
FIG. 17 shows the system as it stands at the end of step 250 of the method of FIG. 11.
Figure 18:
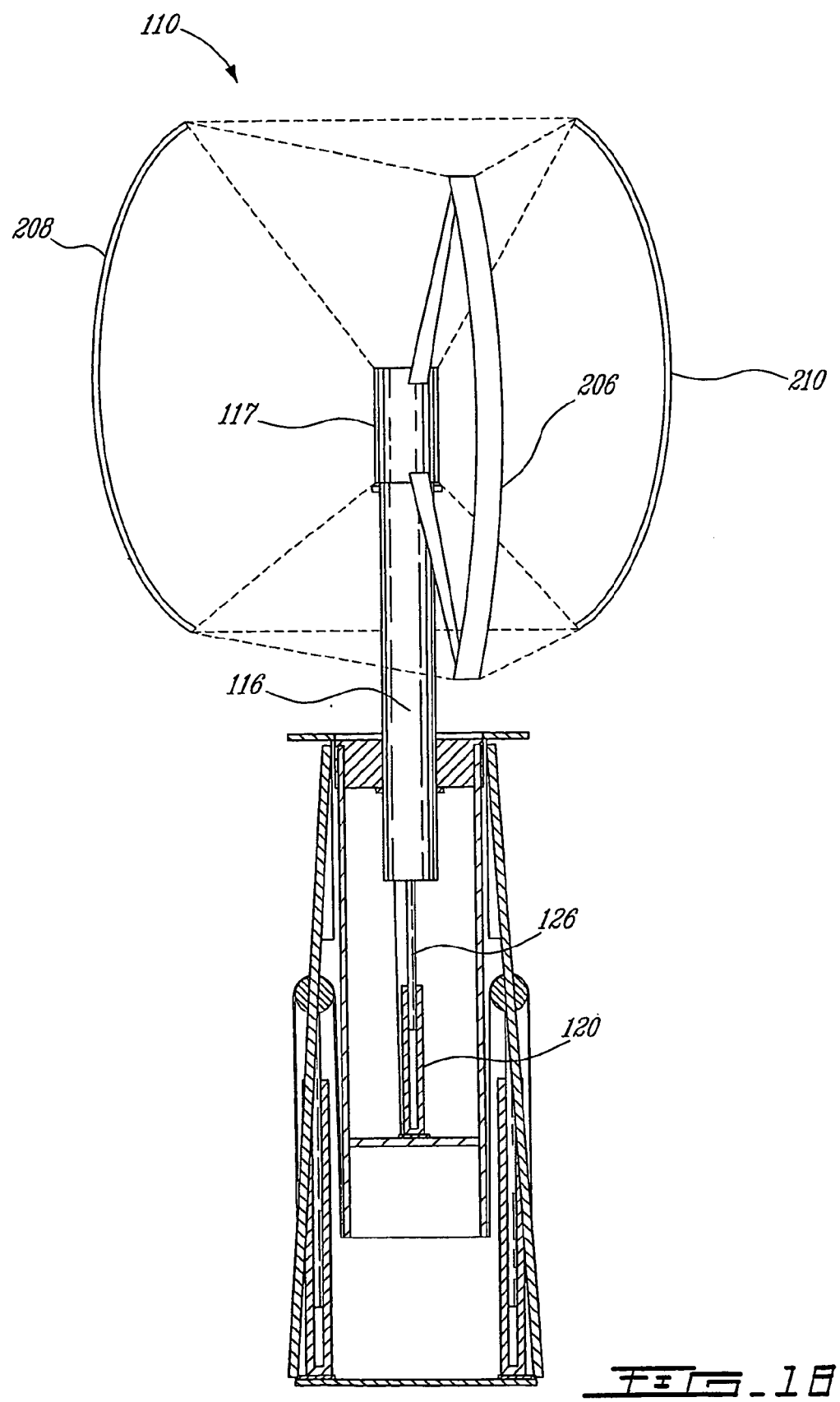
FIG. 18 shows the system as it stands at the end of step 270 of the method of FIG. 11.
Figure 19:
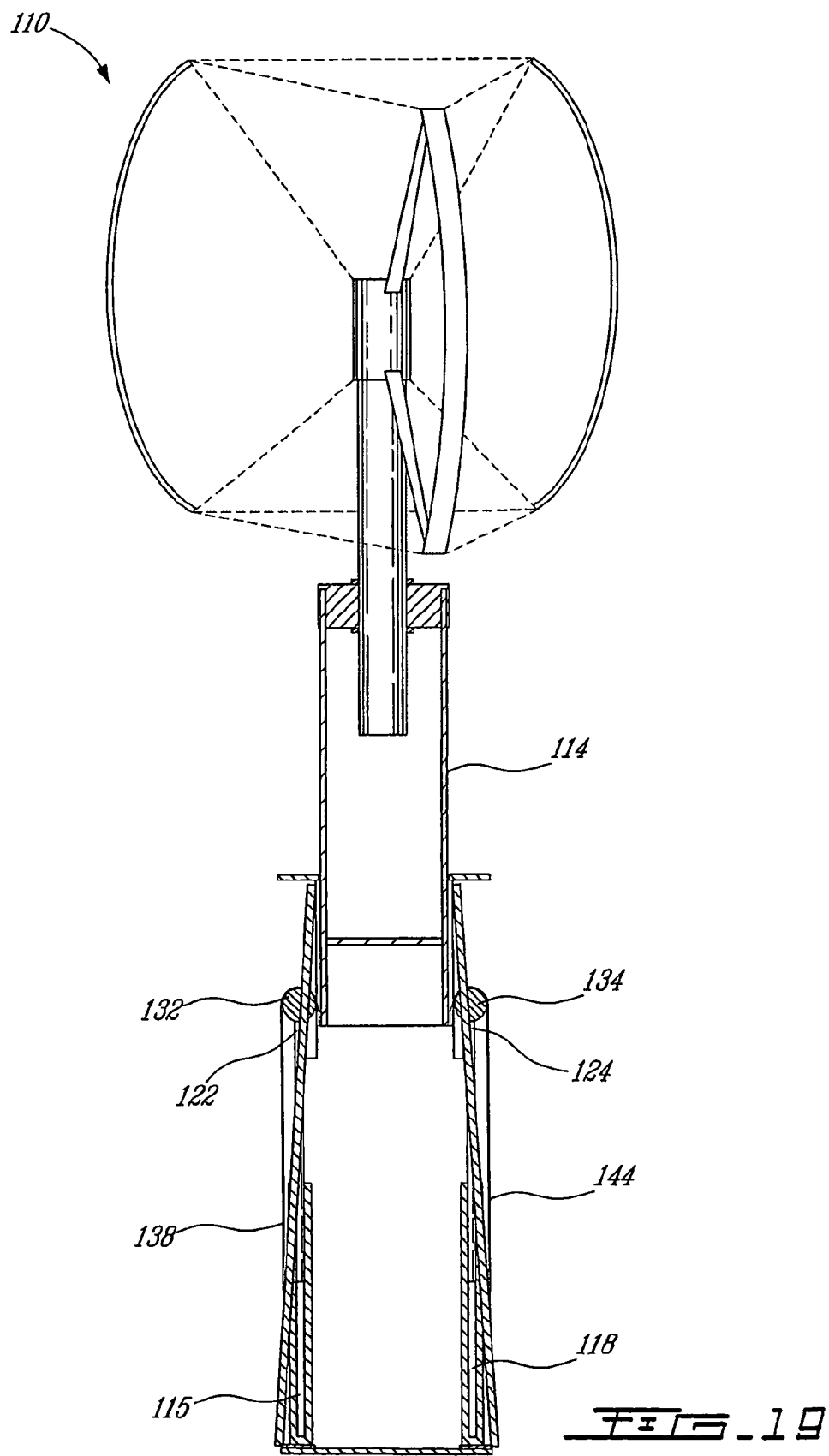
FIG. 19 shows the system as it stands at the end of step 280 of the method of FIG. 11.

Once the bottom pyramidal blade support is mounted, blades 206, 208 and 210 of the kind described hereinabove are deployed in between the top and bottom pyramidal blades supports (step 250, see FIG. 17).

In step 260, the blocking means (not shown) of the rotating shaft 117 are removed before the rotating shaft 117 is mechanically activated. The windmill is then motorized and made to rotate, so as to perform the balance of the rotating mass and the verification of the security brake (not shown).

In the following step 270, the top portion 116 is elevated to its fully extended position by extending the piston rod 126 of the hydraulic jack 120 to its fully extended position (see FIG. 18) The top portion 116 is then fixedly secured in this fully extended position. The hydraulic jack 120 may then be removed from the windmill and eventually be reused to erect another windmill.

Finally, the middle portion 114 of the structure is fully lifted. To achieve this, the pistons rods 122 and 124 of the hydraulic jacks 115 and 118 are fully extended simultaneously so that the cables 138 and 144, respectively engaged in the pulleys 132 and 134, pull the middle portion 114 up. The middle portion 114 is then fixedly secured in this fully extended position (see FIG. 19). The hydraulic jacks 116 and 118 may then be removed (step 290) from the windmill and eventually be reused to erect another windmill. The resulting windmill is illustrated in FIG. 20.

As discussed hereinabove, once the windmill is deployed in the field, the hydraulic jacks are usable for handling another windmill ready to be erected. Alternatively, if the windmill it to be moved regularly, the hydraulic jacks could be permanently mounted thereto.

As will be apparent to people in the art, the erection system of the present invention tends to reduce the number of operations in the field by involving an increased part of the work made in the factory workshop. This feature permits a better control of the quality of the work. Additionally, as the assembling steps taking place in an elevated position are greatly decreased, the overall assembling work is significantly reduced.

From the above, it will be understood that the self-contained self-erecting structure of the present invention is particularly suitable for installation of a windmill in remote areas of difficult access.

Obviously, since the system of the present invention involves the transportation of one single peace of structure instead of three usually shipped in the art, it allows a significant reduction of the shipping costs.

Furthermore, the integrated system of self-erection of the windmill of the present invention is particularly handful in applications requiring mobility, such as in the mining industry for instance.

It should finally be noted that the self erecting structure described hereinabove could be used with different types of windmills, not only with the windmill illustrated herein.

Although the present invention has been described hereinabove by way of preferred embodiments thereof, it can be modified, without departing from the spirit and nature of the subject invention as defined in the appended claims.

What is claimed is:

1. A wind system of the type having a rotating shaft perpendicular to the ground, comprising:
   a plurality of blades positioned in a pre-strained rigid configuration as the wind system is at rest;
   a top set of horizontal tensioned wing-beams, said top set of horizontal tensioned wing-beams having a triangular configuration and connecting the blades to a top end of the rotating shaft; and
   a bottom set of horizontal tensioned wing-beams, said bottom set of horizontal tensioned wing-beams having a triangular configuration and connecting the blades to a bottom end of the rotating shaft;
   wherein said blades and sets of horizontal tensioned wing-beams form a flexible blade attachment assembly, which tends to get flattened under a centrifugal force and adopts a troposkein shape at a target speed of rotation, said troposkein shape being then maintained by the sets of horizontal tensioned wing-beams.

2. The wind system according to claim 1, further comprising a top set of securing elements having a triangular configuration and a bottom set of securing elements having a triangular configuration respectively securing the blades to the rotating shaft.

3. The wind system according to claim 1, wherein each one of said plurality of blades comprises a stress-absorbing member inserted into a sheathing.

4. The wind system according to claim 3, wherein said sheathing is aerodynamically profiled.

5. The wind system according to claim 3, said stress-absorbing member is a leaf spring.

6. The wind system according to claim 3, said sheathing is directly molding onto said stress-absorbing member.

7. The wind system according to claim 3, said sheathing is made of a material that can be easily attached around said stress-absorbing member.

8. The wind system according to claim 3, wherein said sheathing is made of a material selected in the group comprising rubber and fiberglass.

9. The wind system according to claim 3, wherein said stress-absorbing member is pre-shaped to a generally troposkein geometry.

10. The wind system according to claim 9, further comprising a generator assembly to produce electricity.

11. The wind system according to claim 10, wherein said generator assembly comprises a generator connected to a rotation increasing device, said rotation increasing device having a driven shaft mounted to the rotating shaft of the wind system.

12. The wind system according to claim 11, wherein said rotation increasing device is a cycloid speed-increasing gear.

13. The wind system according to claim 12, further comprising an enclosure provided with a base and a top, and enclosing said generator.

14. The wind system according to claim 10, wherein said generator assembly comprises a stator and a rotating casing supported by a stationary base.

15. The wind system according to claim 14, wherein said rotating casing is connected to the rotating shaft by securing elements.

16. The wind system according to claim 14, wherein said rotating casing supports a cover.

17. The wind system according to claim 14, wherein said rotating shaft is shorter than at least one of the blades and the wing beams.

18. The wind system according to claim 1, wherein said wind system is a vertical axis windmill.

19. The wind system according to claim 1, provided with a structure comprising a lower portion; a middle portion, which can telescope in said lower portion; and a top portion holding the rotating shaft, which can telescope in said middle portion.

20. The wind system according to claim 19, wherein said structure further comprises removable hydraulic jacks, each provided with an erecting cable having a mobile end connected to a base of a portion to be erected, and a stationary end attached to a base of a corresponding jack.

21. A blade attachment structure for a windmill, comprising blades connected to a rotating shaft by wing-beams arranged in sets of horizontal wing-beams under tension, said sets of horizontal wing-beams under tension having a triangular configuration and holding a spatial distribution of the blades, and by sets of securing elements, said sets of securing elements having a triangular configuration and being mounted respectively to each sets of horizontal wing-beams, wherein said blades are positioned in a pre-strained rigid configuration as the windmill is at rest.

22. The blade attachment structure according to claim 21, wherein said sets of horizontal wing-beams comprise a first set of honzontal wing-beams and a second set of horizontal wing-beams and said sets of securing elements comprise a first set of securing elements securing the first set of horizontal wing-beams on top of the blade attachment structure and a second set of securing elements securing the second set of horizontal wing-beams at the bottom of the blade attachment structure.

23. The blade attachment structure according to claim 21, comprising three (3) blades.

24. The blade attachment structure according to claim 21, wherein said rotating shaft is shorter than at least one of the blades and the wing beams 25. The blade attachment structure according to claim 21, having at all times a troposkein geometry.

26. A blade attachment structure for a windmill comprising blades mounted to a driving shaft by means of tensioning means and positioned in a pre-strained rigid configuration as the windmill is at rest, said blades being connected in a spatial distribution to at least one set of horizontal wing-beams under tension, said at least one set of horizontal wing-beams having a triangular configuration by said at least one set of securing elements, said at least one set of securing elements having a triangular configuration, in such a way as to form a flexible assembly, which tends to get flattened under a centrifugal force and adopts a troposkein shape at a target speed of rotation, said troposkein shape being maintained by the tensioning means.

27. A generator assembly for the windmill according to claim 1, comprising a generator connected to a rotation-increasing device, said rotation-increasing device having a driven shaft mounted to a rotating shaft of the windmill.

28. The generator assembly according to claim 27 wherein said rotation increasing device is a cycloid speed-increasing gear.

29. The generator assembly according to claim 27, further comprising an enclosure provided with a base and a top, for enclosing said generator.

30. A generator assembly for the windmill according to claim 1, comprising a rotating casing supported by a stationary base through steady bearings, brake shoes, and a stator, wherein said rotating casing is connected to a rotating shaft of the windmill.

31. A self erecting structure for the windmill according to claim 1, comprising a lower portion, a middle portion able to telescope in said lower portion, and a top portion in the form of a stationary enclosure holding a rotating shaft of the windmill and able to telescope in said middle portion.

32. The self erecting structure according to claim 31, wherein a first, a second and a third hydraulic jack, each having an erecting cable with a mobile end connected to a base of the windmill to be erected, and a stationary end attached to a base of the first, second and a third hydraulic jack respectively.

33. The self erecting structure according to claim 31, wherein said erecting cable of the first hydraulic jack passes through a pulley of said first hydraulic jack and has a stationary end attached to the base of said first hydraulic jack; said erecting cable of the second hydraulic jack passes through a pulley of said second hydraulic jack and has a stationary end attached to the base of said second hydraulic jack; said erecting cable of the third hydraulic jack passes through a pulley of said third hydraulic jack and has a stationary end attached to the base said third hydraulic jack.

34. The self erecting structure according to claim 31, wherein a first and a second removable hydraulic jacks are mounted by a respective base thereof on a base of said lower portion, and a third removable hydraulic jack is mounted on a base of said middle portion, said first, second and third removable hydraulic jacks being each provided with a piston rod, each piston rod being provided with a pulley at a distal end thereof respectively.

35. A method for erecting the windmill according to claim 1, said windmill being made of a plurality of telescoping portions, from a lying position comprising successively lifting the telescoping portions to a fully extended position thereof.

* * * * *